United States Patent [19]
Ito et al.

[11] Patent Number: 4,808,841
[45] Date of Patent: Feb. 28, 1989

[54] CENTRALIZED CONTROL SYSTEM FOR HOME ELECTRIC APPLIANCES

[75] Inventors: Yukihiro Ito, Tochigi; Takeshi Imaizumi, Matsudo; Tadayuki Tukahara, Kanuma; Yoshimi Miyamoto, Tochigi, all of Japan

[73] Assignee: Hitachi, Ltd., Tokyo, Japan

[21] Appl. No.: 119,487

[22] Filed: Nov. 12, 1987

[30] Foreign Application Priority Data

Nov. 12, 1986 [JP] Japan .................. 61-267541

[51] Int. Cl.$^4$ .................. H02J 1/00; H04M 11/04
[52] U.S. Cl. .................. 307/11; 307/40; 307/38; 307/31; 340/310 A; 340/310 CP
[58] Field of Search .................. 307/11, 40, 38, 31; 340/310 A, 310 CP, 825.06, 825.07, 825.22, 310 R

[56] References Cited
U.S. PATENT DOCUMENTS

| | | | |
|---|---|---|---|
| 4,162,486 | 7/1979 | Wyler | 307/40 X |
| 4,535,401 | 8/1985 | Penn | 340/310 R X |
| 4,573,127 | 12/1986 | Korff | 307/40 X |
| 4,644,320 | 2/1987 | Carr et al. | 340/310 A |
| 4,703,306 | 10/1987 | Barritt | 340/310 A X |

FOREIGN PATENT DOCUMENTS 6069932 9/1983 Japan.

Primary Examiner—William M. Shoop, Jr.
Assistant Examiner—Sharon D. Logan
Attorney, Agent, or Firm—Antonelli, Terry & Wands

[57] ABSTRACT

Disclosed is a centralized home appliances simultaneous control system consisting of controller(s) and terminal units associated with home electric appliances. Setting of batch control is done in a centralized manner on the controller(s) and it is stored in the memory provided in the controller(s), instead of being done on the individual terminal units. The settings stored in the controller's memory are sent via a communication medium to the memory in each terminal unit, and the setup status of each terminal unit is sent back to the controller(s) for the purpose of monitoring with reference to the contents of the controller's memory. A batch control command signal is issued from the controller(s) to the terminal units, which then responds to control the operation of the associated electric appliances in accordance to the batch control plan corresponding to the command held in the memory of the terminal units.

6 Claims, 3 Drawing Sheets

CENTRALIZED CONTROL SYSTEM FOR HOME ELECTRIC APPLIANCES

BACKGROUND OF THE INVENTION

This invention relates to a centralized control system for home electric appliances, and particularly to a centralized control system for home electric appliances suitable for realizing simultaneous control of a plurality of electric appliances by operation of a controller.

In a conventional "home control system" intended for simultaneous control and monitoring of home electric appliances, each control module or terminal unit associated with an appliance is provided with selector switches for setting whether or not the appliance is to be simultaneous controlled and, in the case of a simultaneous control mode, whether the appliance is to be turned on or off under simultaneous control, as described in JP-A-60-69932. A memory means for storing the settings is provided in each terminal unit, and it is not included in the central controller. This system obliges the user to collect all control modules or to go to all places where control modules are installed in order to make initial settings or change the settings for the simultaneous control. Therefore, it is not easy to have a setting operation, and a wrong setting can be made as the number of control modules increases.

SUMMARY OF THE INVENTION

This invention is intended to solve the foregoing prior art problem, and its prime object is to provide a centralized control system for home electric appliances which is operative to set and change the settings of simultaneous control for a plurality of electric appliances in a centralized manner at the central controller, thereby facilitating the user's setting operation, and is capable of monitoring the settings of remote terminal units of appliances, thereby preventing an erroneous setting.

In order to achieve the above objective, the invention resides in a centralized control system for home electric appliances comprising a controller which controls and monitors in a centralized manner a plurality of electric appliances and a plurality of terminal units which are linked through a communicative medium to the controller and adapted to simultaneous-control the operation of the appliances in response to the signals produced by the controller following the operator's action, wherein the controller includes a setting means used for setting the designation of appliances to be simultaneous-controlled and their controlled operational states, a memory means for storing the settings of all terminal units, a command means for issuing simultaneous control command signals, and a transmission means which sends the settings and a command signal to individual terminal units associated with the appliances to be simultaneous-controlled, and each of the terminal units includes a reception means which receives the signal from the controller and decodes the signal, a memory means for storing the setting of simultaneous control decoded by the reception means, and a control means which reads out the memory means in response to the command and controls the operation of the associated appliance.

The inventive system arrangement features the provision the memory means in both of terminal units and the controller and the procedure of setting the designation of simultaneously-controlled appliances and batch control plans on the part of the controller and storing the plans in the memory means, with signals representing the control plans being transmitted through a communicative medium to the terminal units of batch-controlled appliances so that each terminal unit stores the control plans in its memory means through a reception means, whereby the user can set control plans integrally for all terminal units on the controller, instead of doing separately on individual terminal units. The controller can also monitor the control plans set in the terminal units by making reference to the contents of its own memory means. In operation, a command means in the controller produces a command signal in response to an operator's action, a transmission means in the controller sends the signal to all terminal units, each of which receives the signal by its reception means, and control means in the terminal units refer to their memory means for the control plan corresponding to the command and operate associated appliances accordingly.

DESCRIPTION OF THE PREFERRED EMBODIMENT

Figure 1A:
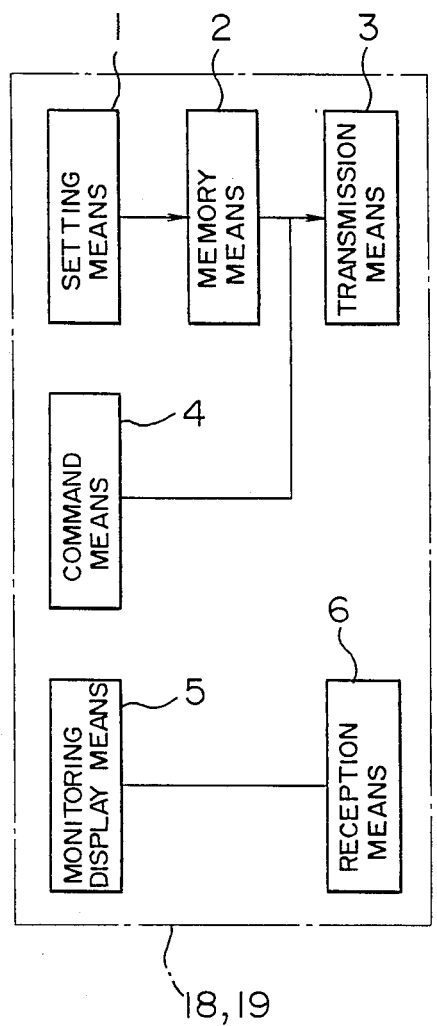
FIG. 1A is a block diagram showing the arrangement of the controller in the home control system embodying the present invention.

An embodiment of this invention will now be described with reference to FIG. 1A through FIG. 3. In FIG. 1A, the controller for implementing the centralized simultaneous control and monitoring of the operation of home electric appliances consists of a setting means 1 which sets the designation of terminal devices associated with electric appliances to be simultaneous-controlled and control plans, i.e., as to whether each of these applicances is to be turned on or turned off, a memory means 2, such as a semiconductor memory or non-volatile memory, for storing the control plans set by the setting means 1, a command means 4 which produces a simultaneous control command in response to an operator's action, a transmission means 3 which sends the signals representing the stored control plans and the operator's command provided by the command means 4 to the terminal units through a communicative medium, e.g., a.c. power line, a reception means 6 which is in connection with the communicative medium for receiving the appliance status signals from the terminal units, and a monitoring display means 5 which monitors and displays the states of terminal units based on the status signals received by the reception means 6.

Figure 1B:
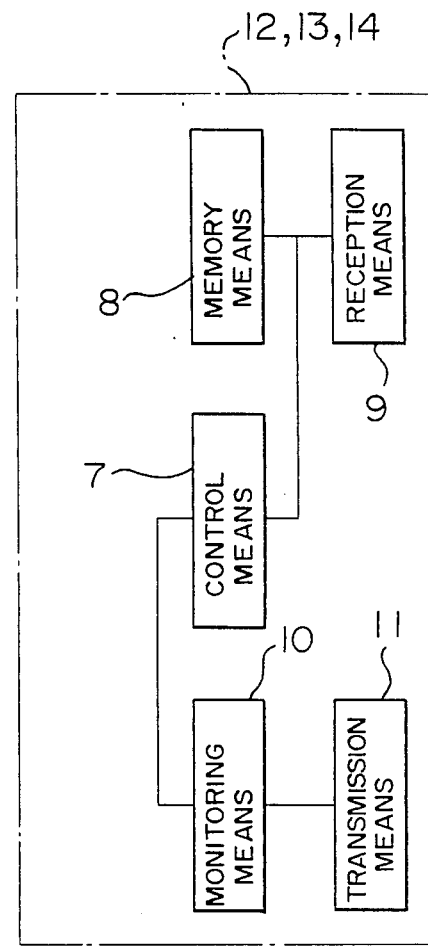
FIG. 1B is a block diagram showing the arrangement of the terminal unit in the home control system embodying the present invention.

In FIG. 1B, each of the terminal units linked with the controller through the communicative medium consists of a reception means 9 which receives a signal sent from the transmission means of the controller and discriminates as to whether the signal is of a simultaneous control plan or a simultaneous control command, a memory means 8, such as a semiconductor memory or non-volatile memory as used in the controller, for storing a value of a signal if it is found to be a simultaneous control plan, a control means 7 which turns on or off the associated electric appliance depending on the stored value of the memory means 8 if the signal is found to be a simultaneous control command, a monitoring means 10 which monitors the on/off status of the associated electric appliance operated by the control means 7, and a transmission means 11 which sends the status information through the communicative medium to the controller when the state of the associated appliance monitored by the monitoring means 10 has made a transition, e.g., from on to off or from off to on. The memory means 2 and 8 used in the controller and terminal units are memory devices of non-volatile type using a semiconductor or a magnetic substance which retain stored information even after power removal.

Next, the operation of the controller and terminal units will be described with reference to Figs. 2A and 2B.

First, the operational sequence of a controller will be described in connection with FIG. 2A. In FIG. 2A, the controller in the input wait state encounters an entry (step 1), and checks whether the entry is for the setting of terminal units of appliances to be simultaneous controlled or the setting of whether each of the appliances are to be turned on or off (step 2). If the entry is for setting the designation of simultaneous-controlled appliances or simultaneous control plans, the control sequence proceeds to the setting process (step 3), and thereafter the controller stores the settings in the memory (step 4), sends the settings to the respective terminal units (step 7), and the control sequence returns to the input wait state (step 1).

If the entry is not for the setting in step 2, but if the entry made in step 1 is found to be a simultaneous control command (step 5), the controller implements the command process for generating a command signal (step 6) and sends the signal to the terminal units (step 7), and the control sequence returns to the input wait state (step 1). In case the step 5 has found that the entry is not for the simultaneous control command, the control sequence branches to the reception process for receiving appliance status signals from the terminal units through the communicative medium (step 8), in which the monitoring display process takes place depending on the received signal (step 9), thereby allowing the user to confirm the normal termination of simultaneous control, and the control sequence returns to the input wait state (step 1).

Next, the operational sequence of a terminal unit will be described in connection with FIG. 2B. The terminal unit in the signal input wait state receives a signal (step 10), implements the signal reception process (step 11), and thereafter discriminates whether the signal is for a simultaneous control plan or batch control command (step 12) and, if it is found to be a control plan, stores the signal value in the memory (step 13), and the control sequence returns to the signal input wait state (step 10). If the signal has been found to be a simultaneous control command, the unit verifies the validity of the simultaneous control command to see whether or not the associated appliance is to be simultaneous controlled (turned on, turned off, or left unchanged), and, upon verification of a valid command, operates the associated appliance in accordance with the setting in the memory 8 shown in FIG. 1B (step 14). Subsequently, the unit implements the monitoring process (step 15) to check if the appliance is turned on or turned off, and, upon detection of a transition in the operational state (step 16), generates an appliance status signal and sends it to the controller (step 17), and the control sequence returns to the signal input wait state (step 10).

Next, an example of the home control system configured using the foregoing controller and terminal units will be described with reference to FIG. 3. In the figure, indicated by 18 and 19 are controllers, and 12, 13 and 14 are terminal units. The terminal units 12, 13 and 14 are connected with electric appliances 15, 16 and 17, respectively. The controllers and terminal units are linked through a communicative medium, which is the a.c. power line wired in the house.

Figure 2A:
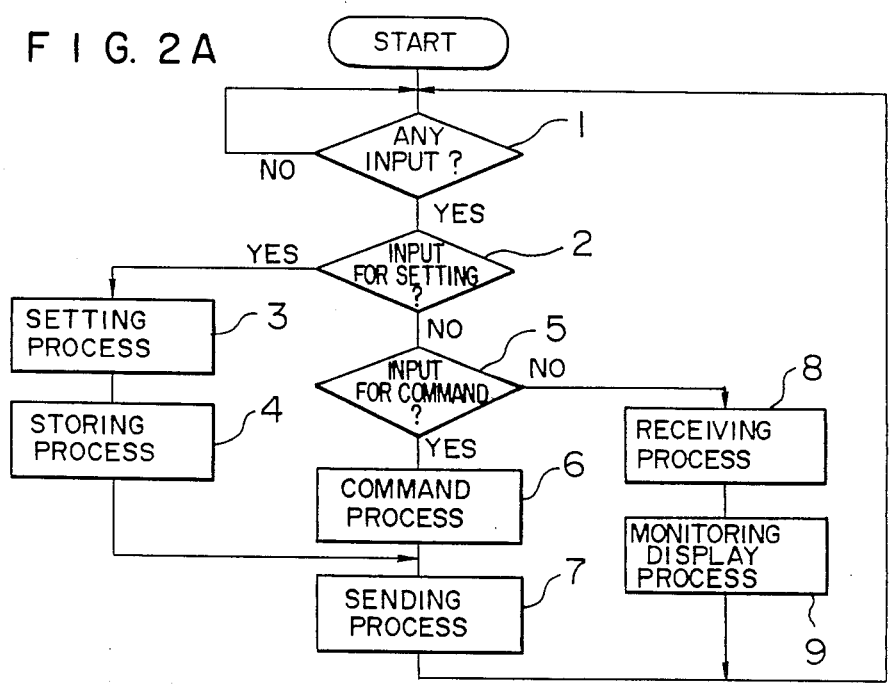
FIG. 2A is a flowchart showing the operational sequence of the controller.
Figure 2B:
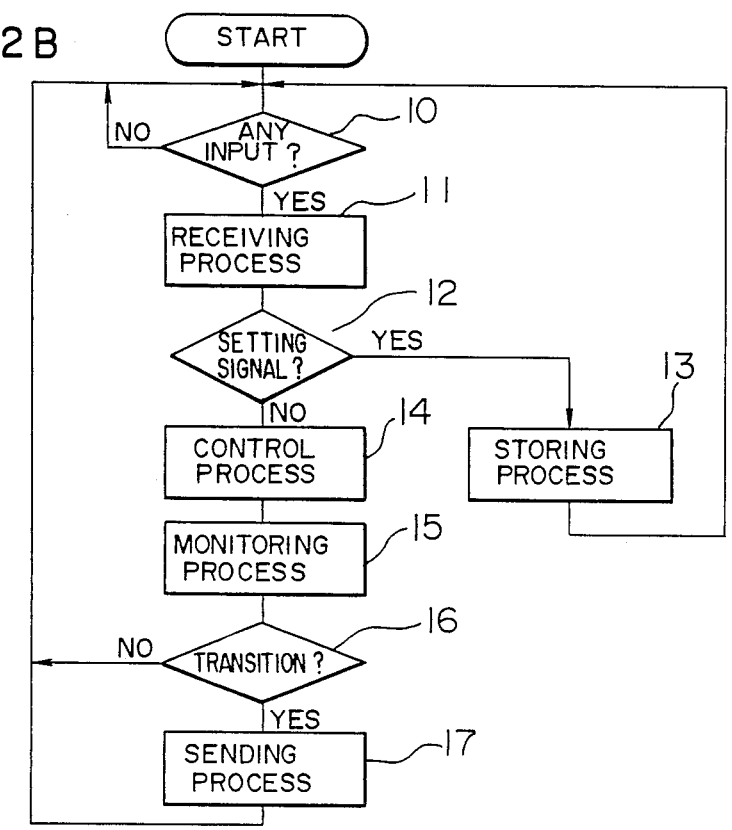
FIG. 2B is a flowchart showing the operational sequence of the terminal unit.
Figure 3:
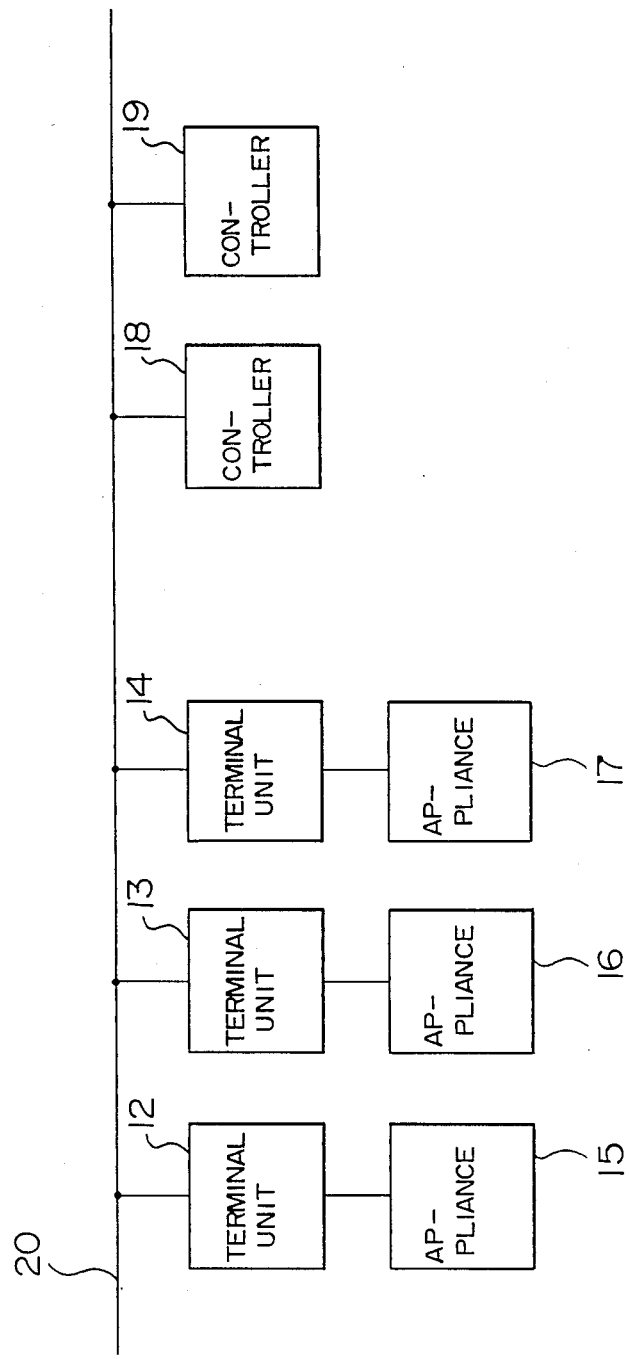
FIG. 3 is a block diagram showing the overall arrangement of the home control system embodying the present invention.

The system arrangement shown in FIG. 3 includes two controllers 18 and 19, and they equally operate to implement the setting of simultaneous control plans and the entry of simultaneous control commands for the terminal units 12, 13 and 14 by way of the communicative medium a.c. power line 20 through the system operation explained of Figs. 2A and 2B.

This embodiment of the invention enables a user to set or change simultaneous control plans in a centralized manner on any controller, whereby terminal units can be added easily and also the number of simultaneous control plans can easily be increased to meet varying needs. In addition, the ability of the controllers to store the settings of simultaneous control plans allows the user to make confirmation at arbitrary time even during the setting or modifying operation, whereby the user can set or modify simultaneous control plans easily and surely and the possibility of erroneous setting is reduced significantly. The controller can also monitor the control plans set in the terminal units by making reference to the contents of its own memory means.

Although in the foregoing embodiment the a.c. power line is used as a communicative medium, other means such as a coaxial cable and an optical fiber cable can of course be adopted.

As described above, this invention provides a centralized control system for home electric appliances which is operative to set and change the settings of simultaneous control for a plurality of electric appliances in a centralized manner at the central controller, thereby facilitating the user's setting operation, and is capable of monitoring the settings of remote terminal units of appliances, thereby preventing an erroneous setting.

We claim:

1. A centralized control system for home electric appliances comprising:
    a controller for implementing centralized simultaneous control and monitoring of the operation of a plurality of electric appliances; and
    a plurality of terminal units linked to said controller through a communication medium for directly controlling operation of said electric appliances;
    wherein said controller includes setting means for setting a designation of electric appliances to be simultaneously controlled and for setting control plans for said simultaneously controlled electric appliances, first memory means for storing set values set by said setting means, command means for entering a simultaneous control command, and first transmission means for sending a signal including said set values and/or said simultaneous control command to terminal units corresponding to said simultaneously controlled electric appliances; and wherein each terminal unit includes first reception means for receiving said signal from said controller and for analyzing said signal, second memory means for storing set values if said signal represents set values, and for storing a control plan which controls operation of a simultaneously controlled electric appliance, and control means for referring to said second memory means to obtain a control plan corresponding to said simultaneous control command and for controlling the operation of said simultaneously controlled electric appliance in accordance with said control plan if said signal represents a simultaneous control command.

2. A control system according to claim 1, wherein said controller further comprises:

second reception means for receiving signals from said terminal units indicative of the states of said terminal units, and monitoring display means for displaying an indication of the states of said terminal units in accordance with said signals received by said second reception means; and wherein each terminal unit further comprises monitoring means for monitoring the operational state of a simultaneously controlled electric appliance associated with said terminal unit, and second transmission means which, when the operational state of said appliance has changed, sends a signal indicative of the change in the operational state of said simultaneously controlled electric appliance to said controller.

3. A control system according to claim 1, wherein said first memory means comprises a non-volatile memory.

4. A control system according to claim 1, wherein said second memory means comprises a non-volatile memory.

5. A control system according to claim 2, wherein said first memory means comprises a non-volatile memory.

6. A control system according to claim 2, wherein said second memory means comprises a non-volatile memory.

* * * * *